Sept 10, 1957 W. J. GREENLEAF 2,805,467
ROTARY CUTTING TOOL
Filed Sept. 29, 1953 3 Sheets-Sheet 1
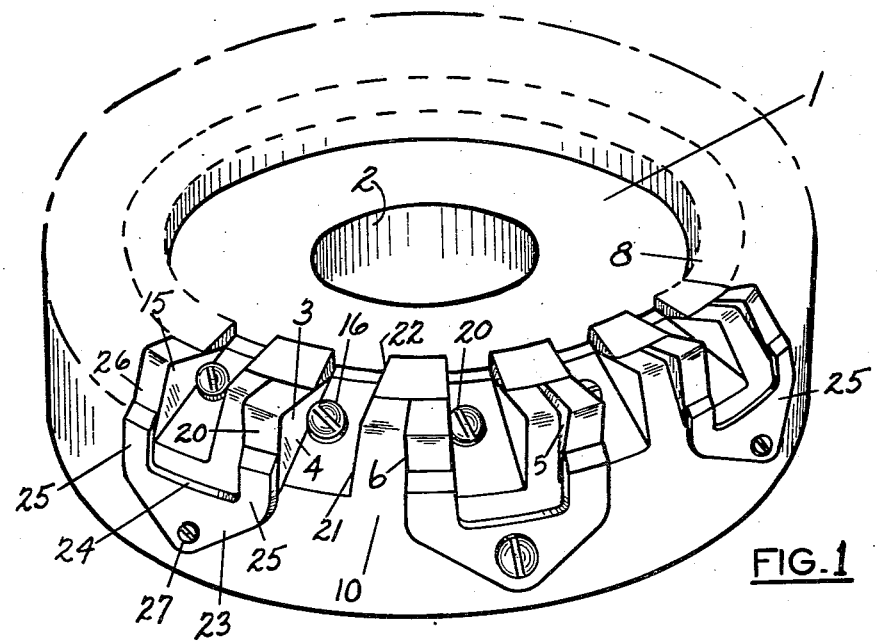
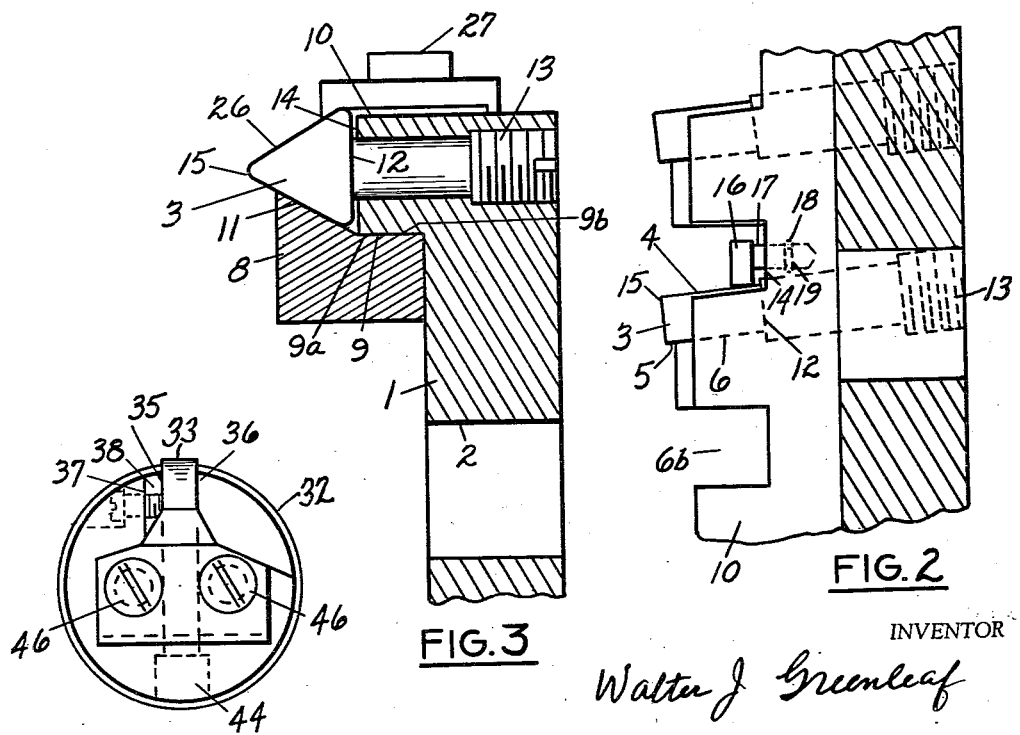
INVENTOR
Walter J. Greenleaf
BY Ralph Hammar
ATTORNEY

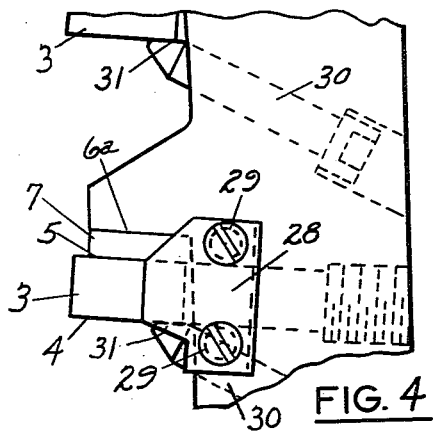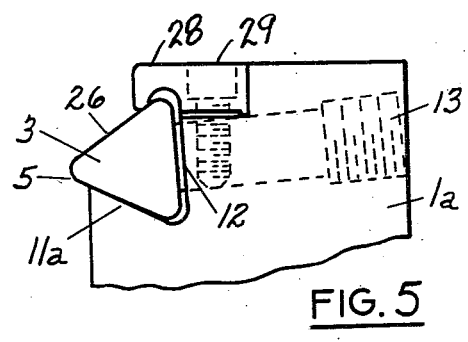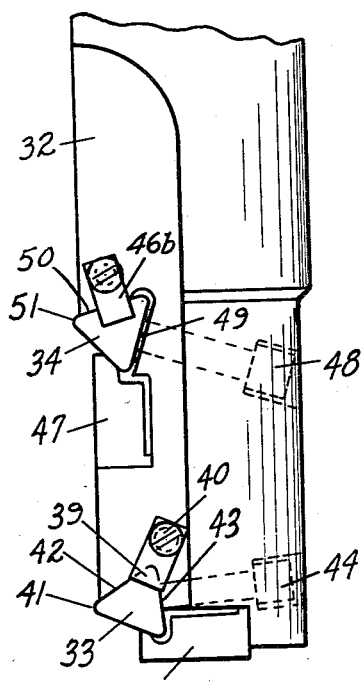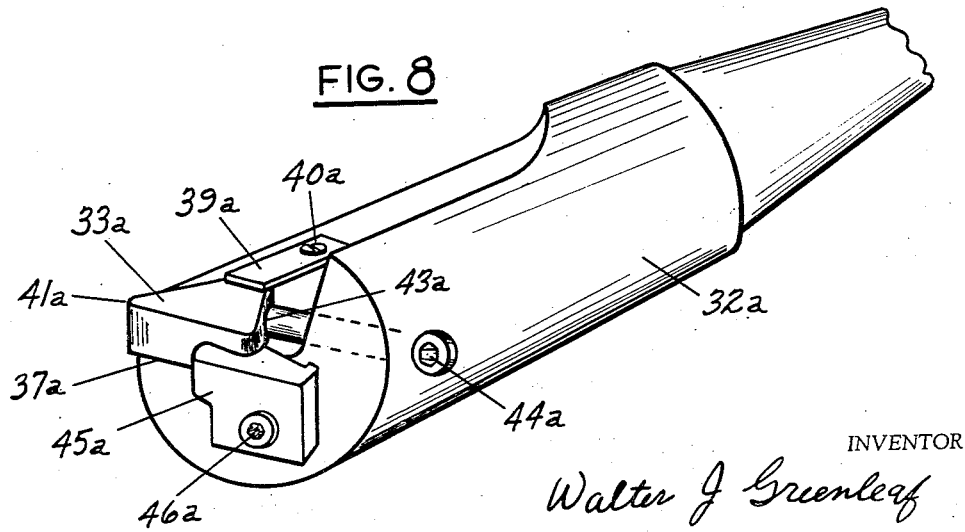

Sept 10, 1957 W. J. GREENLEAF 2,805,467
ROTARY CUTTING TOOL
Filed Sept. 29, 1953 3 Sheets-Sheet 3

INVENTOR.
Walter J. Greenleaf
BY
Ralph Hammar
attorney 2,805,467
Patented Sept. 10, 1957

2,805,467
ROTARY CUTTING TOOL
Walter J. Greenleaf, Meadville, Pa.

Application September 29, 1953, Serial No. 382,991

3 Claims. (Cl. 29—105)

In rotary cutting tools such as boring bars and milling cutters, the cutting edges should project a precise distance from the rotatable body of the cutter. This invention is intended to provide rotary tools with clamped indexable bits of hard metal such as cemented carbides. The bits are of polygonal cross-section, most commonly triangular, with the end faces ground perpendicular to the longitudinal axes of the bits to provide cutting edges on the ends of the bits transmitting the cutting thrusts endwise of the bits. When one of the cutting edges on the bit has become dulled, a fresh cutting edge can be brought into cutting position by successively indexing the bit on its axis and by turning the bit end for end until each side of the polygon at both ends of the bit has been successively brought into cutting position.

In order that the cutting edges of the bits may have a precise projection from the axis of rotation of the cutter, each of the bits is clamped laterally into a socket, one side of which is adjustable to move the bit in the direction of projection of the cutting edge so that machining tolerances will not affect the accuracy of projection of the cutting edges.

Figure 9:
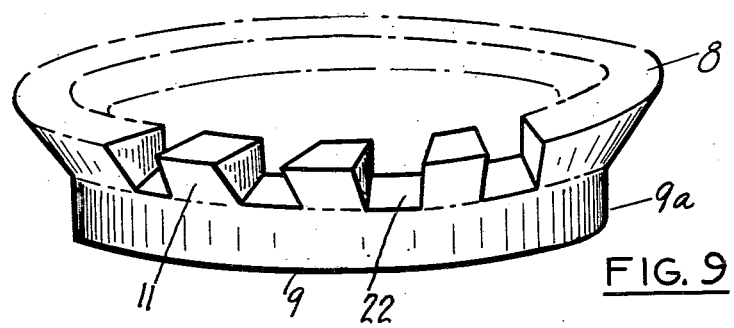
Figure 10:
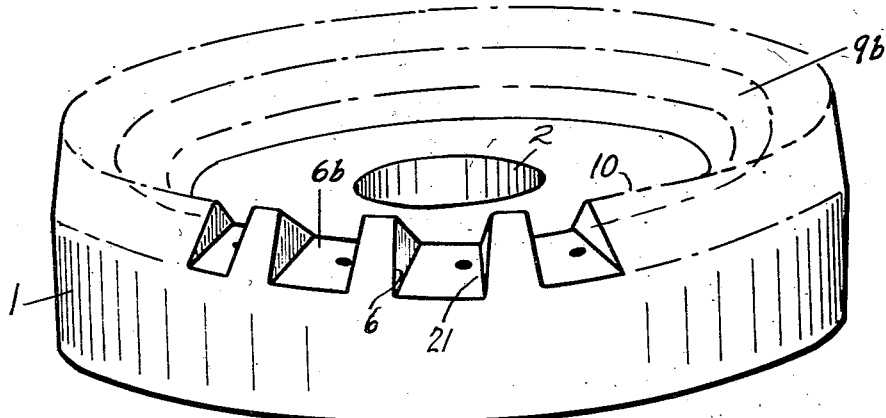

In the accompanying drawing, Fig. 1 is a perspective of a face milling cutter; Fig. 2 is a fragmentary edge view of the cutter; Fig. 3 is a radial section; Fig. 4 is a fragmentary edge view of a modification of the milling cutter; Fig. 5 is a radial section through the Fig. 4 cutter; Fig. 6 is an end view of a boring bar having two bits; Fig. 7 is a top view of the boring bar; Fig. 8 is a perspective of a boring bar having a single bit; Fig. 9 is a perspective of the ring and Fig. 10 is a perspective of the body used in the Figs. 1-3 cutter, both being shown in a partially completed condition.

In the drawing, 1 indicates the body of a face milling cutter having at its center an arbor hole 2 by which the cutter is fastened to a spindle. Around one end face of the cutter at points equidistant from the arbor 2, are a plurality of circumferentially spaced tangentially extending bits 3, which are illustrated as of triangular cross-section, but which may be of any other suitable polygonal section. The bits have end faces 4 and 5 which are ground perpendicular to the length of the bits and which provide at the intersection of the end faces with the sides of the bits as many cutting edges as there are sides to the bit. Each of the cutting edges takes the cutting thrust endwise of the bits and by indexing the bits about the longitudinal axes and by turning the bits end for end, each of the cutting edges may successively be brought into cutting position.

Since the end faces 4 and 5 are perpendicular to the longitudinal axes of the bits 3, the necessary cutting clearance is provided by inclination of the seats 6, which, as shown in Fig. 2, are inclined to the axis of the cutter an amount equal to the cutting clearance angle. As the length of the bits 3 is decreased by the sharpening of the end faces 4 and 5, shims may be placed on the seats 6 of the thickness equal to the amount ground off the end faces 4 and 5 for sharpening, or alternatively instead of the shims, hardened seat inserts 7 of the proper thickness may be inserted after each sharpening of the bits 3.

The seats 6 for the bits 3 are machined directly into a rim 10 on the body 1 of the cutter and as shown more clearly in Fig. 3, the sides of the cutting bits 3 are clamped in a notch provided by the intersection of a beveled seat 11 on a ring 8 with the squared end 12 of an adjusting screw 13 threaded into the rim 10 of the body 1. The seats 6 are one side of open ended grooves 6b which extend across the rim and are machinable by straight passes. The squared ends 12 of the adjusting screws 13 are at the bottoms of the grooves. The bevelled seats 11 may likewise be machined by straight passes across the ring. The ring 8 has an annular rib 9 having a cylindrical surface 9a which seats within a complementary cylindrical surface 9b on the rim 10. Since the sides of the cutting bits 3 are inclined to provide cutting clearance, the same inclination must be present in the beveled seats 11 and in the squared ends 12 of the adjusting screw 13. In other words, the beveled seat 11 and the squared end 12 must be perpendicular to the seats 6. This requires that the adjusting screw 13 be parallel with the seat 6, or, in other words, that the adjusting screw 12 must be inclined at the desired cutting clearance angle to the axis of the cutter. The inclination of the adjusting screws 13 is best shown in Fig. 2, which likewise shows the squared end face 12 of the adjusting screw 13 projecting beyond the end face 14 of the rim 10 on the cutter body 1. By means of the adjusting screws 13, the amount of projection of the cutting tips 15 of the bits 3 beyond the end face of the ring 8 can be accurately adjusted so that all the tips 15 can have the same projection. This is important in milling cutters so that none of the cutters will be overloaded. Once adjusted, worn cutting bits can be replaced without further adjustment of the screws 13. The adjusting screws 13 are of relatively large diameter, as shown in Fig. 2, so that the diameter of the squared end face 12 can be greater than the length of the cutting bits. This insures adequate support of the bit by the faces 12.

It is necessary that the cutting bits 3 be clamped endwise against the seats 6 and laterally into the notches provided by the beveled seats 11 and the square end faces 12 on the adjusting screws 13. The endwise clamping of the bits 3 against the seats 6 may be by any suitable clamping means such as cam clamps having circular heads 16 eccentrically fixed to pins 17 rotatably anchored in the end face of the rim 10 of the cutter body. The endwise clamping prevents rocking of the relatively short bits on the seats 6. A convenient way of anchoring the shanks 17 is by means of radial retainer pins 18 driven into the rim 10 and fitting in a groove 19 in the shank 17. The outer ends of the heads 16 of the clamps are provided with screwdriver slots 20 by means of which the heads may be turned so as to cam the outer end face 4 of the cutting bits 3 back against the seat 6. The heads 16 of the cam clamps are located at the back of chip slots 21 in the rim 10 of the cutter body, which are substantially in line with other chip slots 22 in the ring 8. The chip slots 22 are optional and may be omitted without affecting the performance of the cutter. The heads 16 of the cam clamps engage the end faces 4 of the bits 3 well back of the cutting point 15 so that the endwise clamping in no way interferes with the cutting action. The sidewise or lateral clamping of the bit into the notches 11, 12 is conveniently effected by a dual clamping member 23 having a notch 24 substantially in line with the chip clearance slots 21 and having a pair of arms 25 each of which extends over an outer face 26 of one of the cutting bits 3 and by pressure exerted on that face, clamps the bit back into the notches 11, 12. By means of the dual clamping member, a single bolt 27 threaded into the rim 10 of the cutter body clamps two of the cutting bits 3 laterally into the notches 11, 12.

In this cutter, the cutting bits 3 are securely clamped endwise against the seats 6 and laterally into the notches 11, 12 at right angles to the seats 6. The inclination of the bits to provide the necessary cutting clearance is determined by the seats 6, since the notches 11, 12 are at right angles to the seats. The cutting clearance accordingly remains the same regardless of how the bits are indexed to bring new cutting edges into cutting position. Since sharpening of the bits merely requires grinding off measured amounts of each of the end faces 4, 5, the addition of shims to the seats 6, or the substitution of thicker seat inserts 7, as shown in Fig. 4, will bring a newly sharpened bit back to the same condition as a new bit. This permits repeated sharpening of the bits and materially increases the life without in any way changing the cutting action. The axial projection of the cutting tips 15, which is of primary importance in rotary cutters, is easily adjusted by the adjusting screws 13 which are accessible from the back of the cutter. The adjustment of the screws 13 is to take care of inaccuracies in machining and once adjusted need not be further adjusted as new or re-sharpened bits are replaced.

While the milling cutter has been illustrated as equipped with triangular bits, because these are the most commonly used of the bits of polygonal cross-section, it will be appreciated that by making suitable changes in the notches 11, 12 and in the clamps 23 bits of other than triangular cross-section can be used. The change in the projection of the bit merely requires a change in the shape of the notch into which the bit is laterally clamped. The action of the bit will, however, be the same regardless of the cross-section.

In the modification illustrated in Figs. 4 and 5, the primary differences are in the use of a one-piece body 1a and in different clamps for the endwise and lateral clamping of the bits 3. The cutter has seats 6a which correspond to the seats 6 in the previously described construction, beveled seats 11a which correspond to the seats 11, and uses the same adjusting screws 13 with the squared end faces 12, which cooperate with the beveled seats 11a to provide notches into which the bits 3 are laterally clamped.

The lateral clamping of the bits 3 into the notches 11a, 12 is effected by separate clamping members 28, which engage the outer faces 26 of the bits and urge the bits laterally into the notches 11a, 12. The clamps 28 have two bolts 29. The endwise clamping of the bits 3 against the seats 6a (or against the insert 7 mounted on the seat 6a) is effected by screws 30 threaded into the back of the cutter and having conical points 31, which engage the outer end faces 4 of the bits and urge the bits endwise back against the seats 6a. In all other respects, the milling cutter illustrated in Figs. 4 and 5 is the same as that illustrated in Figs. 1-3 and has the same precision adjustment of the projection of the cutting point 15 by means of the adjusting screws 13 and the same rigid sidewise and endwise clamping of the bits which insures proper cutting action in any indexed position of the bits. Likewise, the cutting clearance is not determined by the manner in which the bits are sharpened, but is rather determined by the inclination of the seats 6a and of the notches 11a, 12 which are perpendicular to the seats.

In the boring bar illustrated in Figs. 6 and 7, there is the same requirement as in the milling cutters for precision adjustment of the projection of the cutting edges from the axis of rotation of the boring bar. The boring bar has a body 32 on which are mounted two cutters 33 and 34 of polygonal cross-section similar to the cutters 3 used in the milling cutter. As with the milling cutter, the cutters are illustrated as of triangular cross-section since this is the most commonly used shape. Like the cutting bits 3, the cutting bits 33 and 34 have end faces 35 and 36 which are perpendicular to the length of the bit thereby providing three cutting edges at each end face which can be brought into cutting position by indexing the bit and by turning it end for end. As shown in Fig. 6, the end face 35 is clamped against a seat 37 having a flat hardened insert 38 of such thickness that the outer or cutting face 36 is always the same distance from the seat 37. The bit is clamped against the seat 37 by a clamp 39 engaging the inner part of the face 36 and held in clamping engagement therewith by a clamping screw 40. The clamp 39 holds the bit 33 securely against the seat 37 and either by the use of replaceable inserts 38 or by shims maintains the cutting face 36 a constant distance from the seat 37 in any indexed position of the bit 33.

In boring bars, it is important that the cutting tip 41 be a constant distance from the center of rotation of the boring bar in any indexed position of the bit 33. This is accomplished by laterally clamping the bit into a notch comprising an inclined face 42 machined in the boring bar and a square end face 43 on an adjusting screw 44 threaded into the boring bar and of construction identical with the adjusting screw 13 used in the milling cutter. The diameter of the square end face 43 of the adjusting screw 44 is greater than the length of the bit 33 so that the square end face 43 provides ample support for the bit. The face 43 cooperates with the face 42 to provide a notch into which the bit is clamped laterally by a clamping member 45 fixed to the end of the boring bar by bolts 46. As in the milling cutter, the purpose of the adjusting screw 44 is to compensate for inaccuracy in machining so that once the screw 44 is adjusted, the notch defined by the face 42 and the end face 43 of the adjusting screw will locate the cutting tip 41 a fixed distance from the center of rotation of the boring bar.

The other cutting bit 34 on the boring bar is mounted in the same manner as the cutting bit 33 there being an endwise clamping member 46b, a sidewise clamping member 47, and an adjusting screw 48 threaded into the boring bar and having a square end face 49 which cooperates with a surface 50 machined in the boring bar to precisely locate the tip 51 a fixed distance from the center of rotation of the boring bar in indexed position of the bit 34.

The boring bar shown in Fig. 8 is similar to that shown in Figs. 6 and 7, except that it has only a single cutting bit 33a mounted at the end of a body 32a. The cutting bit 33a is clamped endwise against a seat 37a by a clamp 39a bolted to the boring bar by a bolt 40a. The cutting bit 33a is clamped laterally into a notch formed by the intersection of an inclined surface 42a on the boring bar and a square end face 43a on an adjusting screw 44a threaded into the boring bar. The lateral clamping is effected by a clamping member 45a, which is bolted to the end of the boring bar by a bolt 46a. By proper adjustment of the adjusting screw 44a, the cutting tip 41a of the bit 33a can be accurately adjusted so as to have a fixed distance from the axis of roation of the boring bar in any indexed position of the bit.

What is claimed as new is:

1. In a milling cutter, a body having a cylindrical surface concentric with the axis of the cutter and extending axially inward from one end of the body, a ring having a complementary cylindrical surface, the ring and body being telescoped together and the ring being removable by sliding off said one end of the body, a rim on the body extending radially outside said cylindrical surface, a plurality of circumferentially spaced tangentially extending polygonal bits around the axis of rotation of the body with the longitudinal axes of the bits inclined to provide cutting clearance, each bit having end faces normal to the length of the bit, one of which provides a seating surface and the other of which provides a cutting surface and having sides normal to the end faces, a plurality of circumferentially spaced open ended grooves in the rim, each groove having one side normal to the length and engaging one end of a bit and providing an end seat for the bit, a side seat at the bottom of each groove parallel to and engaging one of the polygonal sides of the bit, the seats in each groove being machinable and grindable by straight passes across the rim, clamping means engaging the other end of each bit and clamping it endwise against its end seat, said ring having a section adjacent the rim, a plurality of seats in said section of the ring corresponding to the side seats in the rim, each of the seats in the ring diverging from the bottom of a groove in the rim and being parallel to and engaging another of the polygonal sides of the bit and providing a side seat for the bit, each seat in the ring being unobstructed at each end and machinable by straight passes across the ring, said side seats on the rim and ring cooperating to form a notch locating the bits as they are indexed to bring fresh cutting edges into cutting position.

2. In a milling cutter, a body having a cylindrical surface concentric with the axis of the cutter and extending axially inward from one end of the body, a ring having a complementary cylindrical surface, the ring and body being telescoped together and the ring being removable by sliding off said one end of the body, a rim on the body extending radially outside said cylindrical surface, a plurality of circumferentially spaced tangentially extending polygonal bits around the axis of rotation of the body with the longitudinal axes of the bits inclined to provide cutting clearance, each bit having end faces normal to the length of the bit, one of which provides a seating surface and the other of which provides a cutting surface and having sides normal to the end faces, a plurality of circumferentially spaced open ended grooves in the rim, each groove having one side normal to the length and engaging one end of a bit and providing an end seat for the bit, a side seat at the bottom of each groove parallel to and engaging one of the polygonal sides of the bit, the seats in each groove being machinable and grindable by straight passes across the rim, clamping means engaging the other end of each bit and clamping it endwise against its end seat, said ring having a section adjacent the rim, a plurality of seats in said section of the ring corresponding to the side seats in the rim, each of the seats in the ring being parallel to and engaging another of the polygonal sides of the bit and providing a side seat for the bit, each seat in the ring being machinable by straight passes across the ring, said side seats on the rim and ring cooperating to form a notch locating the bits as they are indexed to bring fresh cutting edges into cutting position.

3. In a milling cutter, a body having a cylindrical surface concentric with the axis of the cutter and extending axially inward from one end of the body, a ring having a complementary cylindrical surface, the ring and body being telescoped together and the ring being removable by sliding off said one end of the body, a rim on the body extending radially outside said cylindrical surface, a plurality of circumferentially spaced tangentially extending equiangular triangular bits around the axis of rotation of the body with the longitudinal axes of the bits inclined to provide cutting clearance, each bit having end faces normal to the length of the bit, one of which provides a seating surface and the other of which provides a cutting surface and having sides normal to the end faces, a plurality of circumferentially spaced open ended grooves in the rim, each groove having one side normal to the length and engaging one end of a bit and providing an end seat for the bit, a side seat at the bottom of each groove parallel to and engaging one of the triangular sides of the bit, the seats in each groove being machinable and grindable by straight passes across the rim, clamping means engaging the other end of each bit and clamping it endwise against its end seat, said ring having a section adjacent the rim, a plurality of seats in said section of the ring corresponding to the side seats in the rim, each the ring corresponding to the side seats in the rim, each of the seats in the ring diverging from the bottom of a groove in the rim and being parallel to and engaging another of the triangular sides of the bit and providing a side seat for the bit, each seat in the ring being unobstructed at each end and machinable by straight passes across the ring, said side seats on the rim and ring cooperating to form a notch with one side of each notch substantially radial and the adjoining side of each notch at an angle of 60 degrees to said one side for locating the bits as they are indexed to bring fresh cutting edges into cutting position.

References Cited in the file of this patent

UNITED STATES PATENTS

| | | |
|---|---|---|
| 693,974 | Koeller et al. | Feb. 25, 1902 |
| 1,089,527 | Bolton | Mar. 10, 1914 |
| 1,411,390 | Tibbetts | Apr. 4, 1922 |
| 1,484,207 | Campbell | Feb. 19, 1924 |
| 1,914,411 | Earl | June 20, 1933 |
| 2,033,384 | Marshall | Mar. 10, 1936 |
| 2,136,592 | Mayer | Nov. 15, 1938 |
| 2,492,797 | Guetzkow | Dec. 27, 1949 |
| 2,648,893 | Begle | Aug. 18, 1953 |
| 2,656,591 | Billman | Oct. 27, 1953 |
| 2,690,610 | Begle | Oct. 5, 1954 |

FOREIGN PATENTS

| | | |
|---|---|---|
| 435,833 | Great Britain | Sept. 30, 1935 |
| 667,936 | Great Britain | Mar. 12, 1952 |
| 695,778 | Great Britain | Aug. 19, 1953 |